(No Model.)  2 Sheets—Sheet 1.
M. HOWARD.
GAME APPARATUS.

No. 461,018. Patented Oct. 13, 1891.

Witnesses:
A. Ruppert
Edwin Cuse

Inventor:
Mabel Howard,
by G.H. & W.T. Howard,
Attys.

(No Model.)  2 Sheets—Sheet 2.
M. HOWARD.
GAME APPARATUS.
No. 461,018.  Patented Oct. 13, 1891.
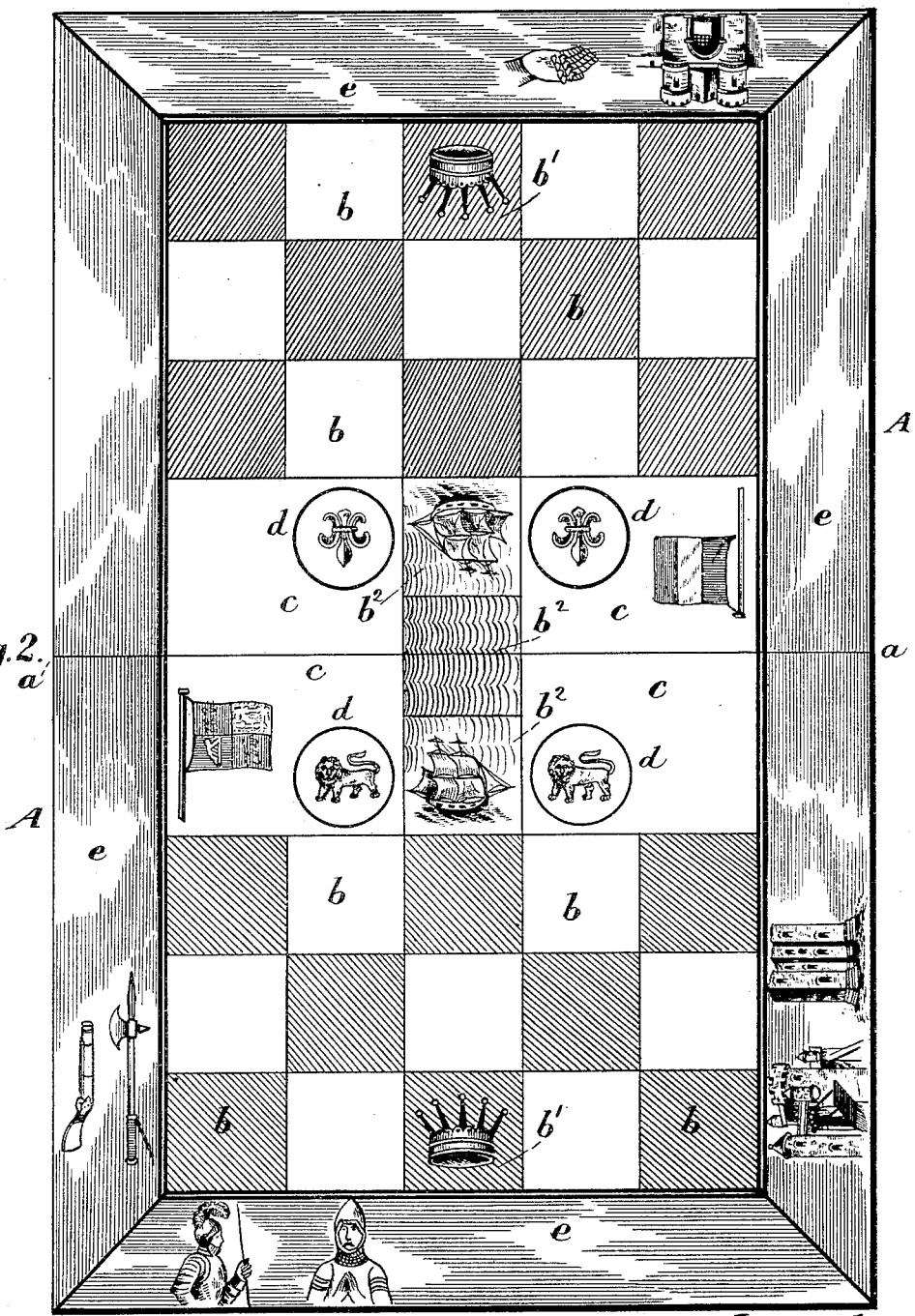

UNITED STATES PATENT OFFICE.

MABEL HOWARD, OF WASHINGTON, DISTRICT OF COLUMBIA.

GAME APPARATUS.

SPECIFICATION forming part of Letters Patent No. 461,018, dated October 13, 1891.

Application filed December 23, 1890. Serial No. 375,591. (No model.)

*To all whom it may concern:*

Be it known that I, MABEL HOWARD, of the city of Washington, in the District of Columbia, have invented an Improvement in Games, of which the following is a specification, reference being had to the accompanying drawings, and to the letters of reference marked thereon.

This invention relates to that class of games in which a board having a series of squares is used in connection with pieces or men adapted to be moved from square to square.

Figure 1:
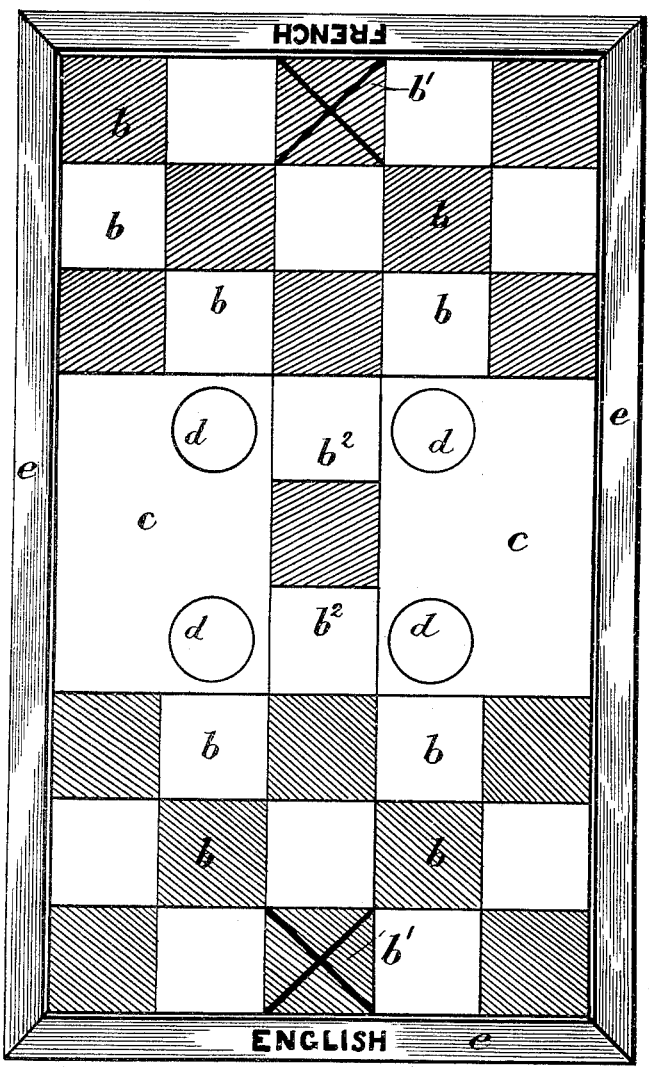
Figure 3:
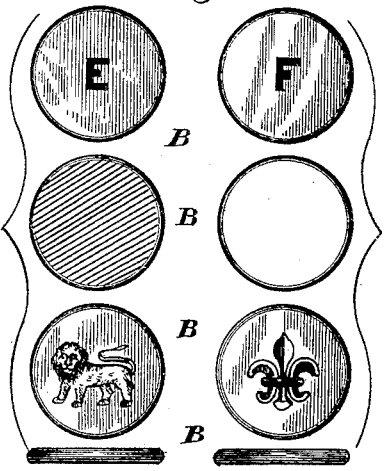
Figure 4:
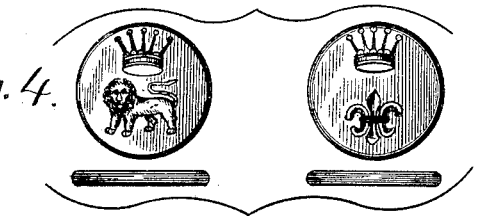

In the accompanying drawings, Figure 1 is a plan view of a plain board constructed in accordance with my invention. Fig. 2 is a similar view showing a modification in the shape of a more elaborate form of board. Fig. 3 represents pieces or men, and Fig. 4 shows a detail.

Similar letters of reference indicate similar parts in the respective figures.

A is the board, which may be in two parts hinged together at the center, as at *a*, or solid, as shown in Fig. 1. The squares *b*, arranged at each side of the board, may be of any suitable number, the number of rows of squares being also optional. I prefer to use five squares in each row, and three rows of squares on each side, as shown. The squares marked *b'* are what I term "crown-squares," and may have upon them any mark to distinguish them from the other squares, or may differ from them in color. I prefer to distinguish the crown-squares by placing thereon the symbol of the crown, as shown in Fig. 2. The squares *b* may be of one color throughout and separated by distinctly-marked lines of contrasted colors. The squares $b^2$, connecting the rows of squares at the opposite sides of the board, constitute what I term "the channel," the rows of squares on one side of the channel being supposed to be on French territory and the opposite ones on English territory. The number of squares constituting the channel is not arbitrary, and if the squares *b* are of one color throughout the squares of the channel may correspond with them in color, or may agree with any alternate or contrasted coloring of the squares, or, (and this is my preferred arrangement,) they may be colored blue to represent water, and, further, may have upon them representations of ships, as seen in Fig. 2. The spaces *c* on either side of the channel may be plain or colored, and in one space may be printed the word "French" and in the other the word "English." On the French side may appear the tricolor and on the English the royal ensign. In each space *c* are arranged two thrones outlined by circles or spots *d*. The French thrones may bear the fleur-de-lis or other symbol of French royalty, and the English a lion or other mark of English royalty. All these symbols may be used or omitted at pleasure, they not affecting the action of the game, but tending to make the board more attractive. The bordering *e* of the board may be plain, as shown in Fig. 1, or contain a chart of history or pictures, such as represent historical scenes characteristic of the age of chivalry being preferred. A suggestion of this meaning is given in Fig. 2.

B in Fig. 3 represents the pieces or men, which may be of ivory, wood, bone, celluloid, &c., those of the French side being by preference of one color and those of the English another. The men, however, may be of one color, and those of the French side bear the letter "F" or a mark distinctive of French nationality, and those of the English the letter "E" or a symbol of English nationality.

Fig. 4 shows the crowns with which the men are crowned in order to make them kings, as will hereinafter appear, they also preferably being given a distinguishing mark.

ACTION AND RULES OF THE GAME.

The game is played by two, and is won by the player who first gets two kings (or more properly a king and a queen) upon the enemy's thrones. The men, in this instance nine to each player, are placed on the squares of the first two rows, the advance rows and the crown-squares being left vacant. The game then proceeds in accordance with the following rules:

1. *Move of the men.*—The men are moved by the two players from square to square forward, or either way sidewise, but not backward or diagonally.

2. *Jumping.*—A man may in any direction of the ordinary move jump an enemy's piece to a vacant square not a crown-square; but the piece jumped is not to be removed from the board. A man may jump an enemy's piece more than once while the latter is in the same position, but is not required to do so. If more than one of the enemy's pieces can be jumped, the player chooses which one to jump first. Only one piece can be jumped at one time. The player cannot jump his own pieces. No challenge to jump shall be refused.

3. *The pilgrimage.*—After having crossed the channel the man preparatory to being crowned a king must "go on a pilgrimage" to either of the corner squares in the crown-square row.

4. *Crowning.*—He must now move square by square, or jump, as above, to the crown-square. The man cannot go upon the enemy's crown-square until made a king or in order to be crowned one. Any number of men may be crowned kings. Either player may occupy his own crown-square until obliged to leave it when challenged to jump an enemy's piece.

5. *Move of the king.*—A king has the same move and jump as a man with the addition that he can move and jump backward.

6. *The thrones.*—A king reaching a square between the thrones of the enemy takes his place upon one of them.

7. *Clearing the channel.*—If the player who is to move is unable to advance any one of his men or move any king toward the enemy's thrones, (a move sidewise will not suffice,) and if the removal of the pieces from the channel will admit of such advance or movement, the channel is to be cleared of all pieces belonging to either player, the said pieces being removed from the board. The pieces so removed are said to be "shipwrecked in the channel" or "lost at sea." The channel having been cleared, the move is made by the player in whose interest the clearing was done.

8. *Drawn games.*—If the clearing of the channel will not admit of such movement of a piece or the playing should be blocked, the game is a draw.

In defending his position the player will of course use every means to hold the channel, draw off the enemy from the squares thereof by challenging him to jump, and otherwise guard the squares opposite the thrones that the enemy cannot get upon his (the hostile) thrones.

Having described my invention, I claim—

1. A game-board consisting of two sides of squares, a space between them, a channel composed of squares crossing the space, and a crown-square on each side of squares, substantially as set forth.

2. A game-board consisting of two sides of squares, a space between them having throne-spots thereon, and a channel composed of squares crossing the space between the thrones, substantially as set forth.

3. A game-board consisting of two sides of squares, a space between them, a channel composed of squares crossing the space, and throne-spots in said space arranged on each side of the channel, the respective sides of squares, the spaces, and throne-spots bearing words or symbols distinctive of different nationalities or interests, substantially as set forth.

4. A game-board having two sides of squares, a channel composed of squares, and throne-spots, combined with men and crowns for crowning men kings, substantially as set forth.

5. A game-board having two sides of squares, a channel composed of squares, crown-squares, and throne-spots, combined with men and crowns for crowning men kings, substantially as set forth.

In testimony whereof I hereto set my hand and seal.

MABEL HOWARD. [L. S.]

Witnesses:
WARDER VOORHEES,
GEORGE H. HOWARD.